United States Patent [19]

Stelma

[11] 4,341,444
[45] Jul. 27, 1982

[54] ELECTRICALLY OPERATED REMOTE CONTROL REARVIEW MIRROR

[75] Inventor: Gerard N. Stelma, Grand Rapids, Mich.

[73] Assignee: Keeler Corporation, Grand Rapids, Mich.

[21] Appl. No.: 174,535

[22] Filed: Aug. 1, 1980

[51] Int. Cl.³ .............................................. G02B 7/18
[52] U.S. Cl. ..................................... 350/289; 248/487
[58] Field of Search ............ 350/289; 74/89.13, 89.14, 74/89.15, 501 M; 248/481, 484, 487

[56] References Cited

U.S. PATENT DOCUMENTS

| Re. 27,172 | 9/1971 | Van Noord | 74/501 M |
|---|---|---|---|
| 2,573,127 | 10/1951 | Von Bredow | 88/93 |
| 2,664,785 | 1/1954 | Roehrig | 88/98 |
| 3,027,807 | 4/1962 | Barcus et al. | 88/93 |
| 3,202,015 | 8/1965 | Moul, Jr. et al. | 74/665 |
| 3,233,475 | 2/1966 | Barber | 74/90 |
| 3,251,238 | 5/1966 | Fuqua | 74/501 |
| 3,283,607 | 11/1966 | Van Noord | 74/501 |
| 3,421,728 | 1/1969 | Gordon | 248/477 |
| 3,459,470 | 8/1969 | Hohn | 350/289 |
| 3,613,464 | 10/1971 | Archer | 74/501 M |
| 3,628,862 | 12/1971 | Stephenson | 350/289 |
| 3,917,212 | 11/1975 | Hadley et al. | 248/487 |
| 3,918,319 | 11/1975 | Mills | 74/491 |
| 3,972,597 | 8/1976 | Repay et al. | 350/289 |
| 4,101,205 | 7/1978 | Bos | 350/289 |
| 4,101,206 | 7/1978 | Oskam et al. | 350/289 |
| 4,114,988 | 9/1978 | Enomoto | 350/289 |
| 4,158,483 | 6/1979 | Fisher et al. | 350/289 |
| 4,159,866 | 7/1979 | Klunsch et al. | 350/289 |
| 4,286,841 | 9/1981 | Deshaw | 350/289 |

FOREIGN PATENT DOCUMENTS 54-162344 12/1979 Japan ................................... 350/289

OTHER PUBLICATIONS

Serial No. 73,069, Patentee: Deshaw

Primary Examiner—F. L. Evans
Attorney, Agent, or Firm—Price, Heneveld, Huizenga & Cooper

[57] ABSTRACT

An electrically actuated rearview mirror comprises a mirror, a support housing and means for pivotally mounting the mirror on the support housing. The mirror is pivotal about mutually orthogonal X and Y axes. A sphere is mounted on the back of the mirror and is disposed inwardly of the housing on a rod extending through an aperture in the housing. The X and Y drive means are disposed within the housing and arranged to engage the sphere for pivoting the mirror about the X and Y axes, when electrical power is applied to the drive means. The X drive means comprises a first surface, slidably engaging and partially encompassing the sphere and the Y drive means comprises a second surface slidably engaging and partially encompassing the sphere. The first and second surfaces extend in mutually orthogonal directions. The first and second cylindrical surfaces of the X and Y drive means are disposed on slides which are reciprocally mounted for displacement in mutually orthogonal directions in the housing. The slides are provided with clutch mechanisms including follower springs biased into sliding engagement with helical tracks disposed on the output shafts of the X and Y drive means to provide for ratchet-like adjustment of the mirror relative to the housing in the event of a power failure or in the case where the mirror reaches an adjustment stop. A resiliently deformable boot extends between the back of the mirror and the housing to provide a flexible seal for the housing aperture.

38 Claims, 14 Drawing Figures

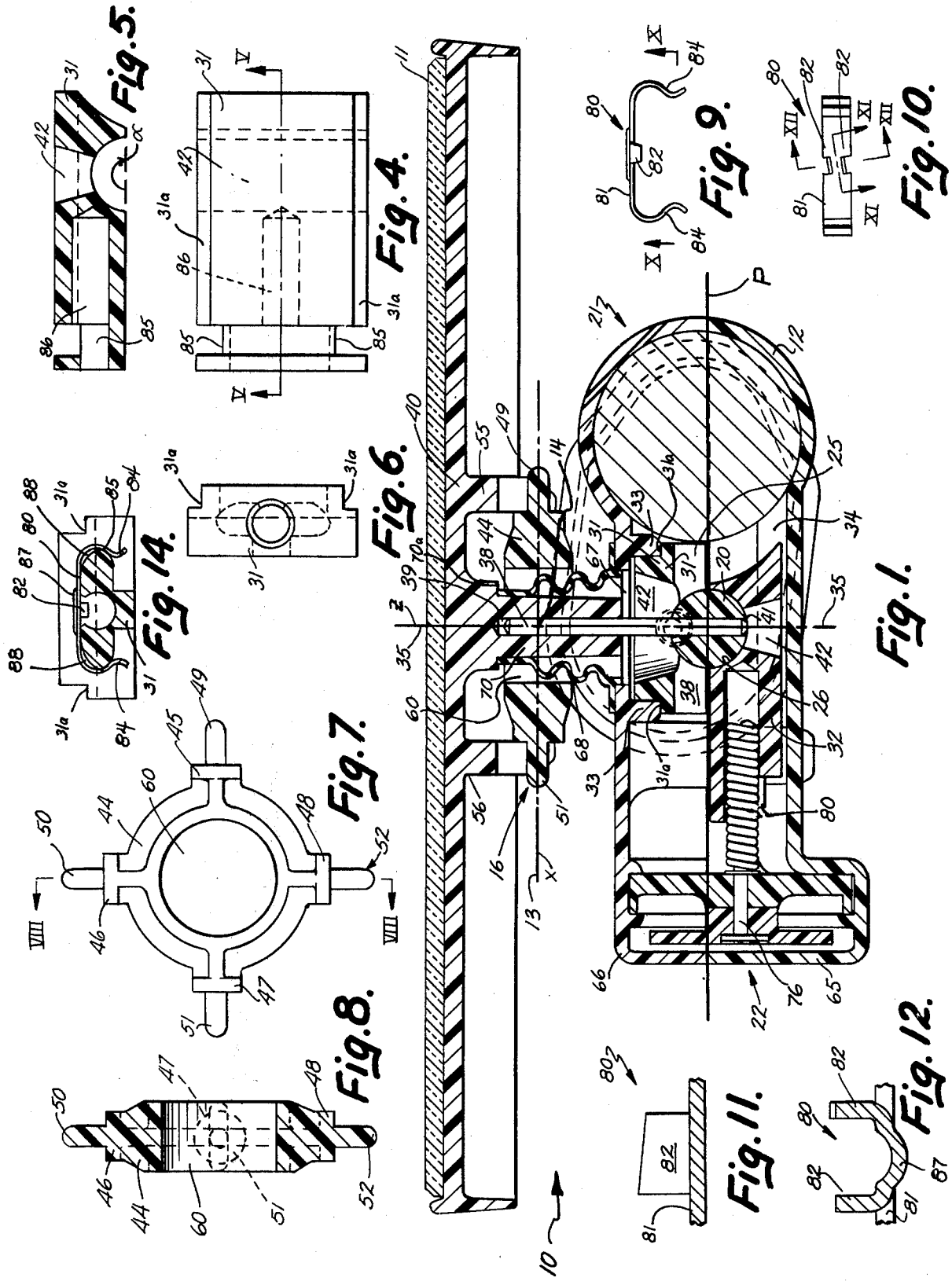

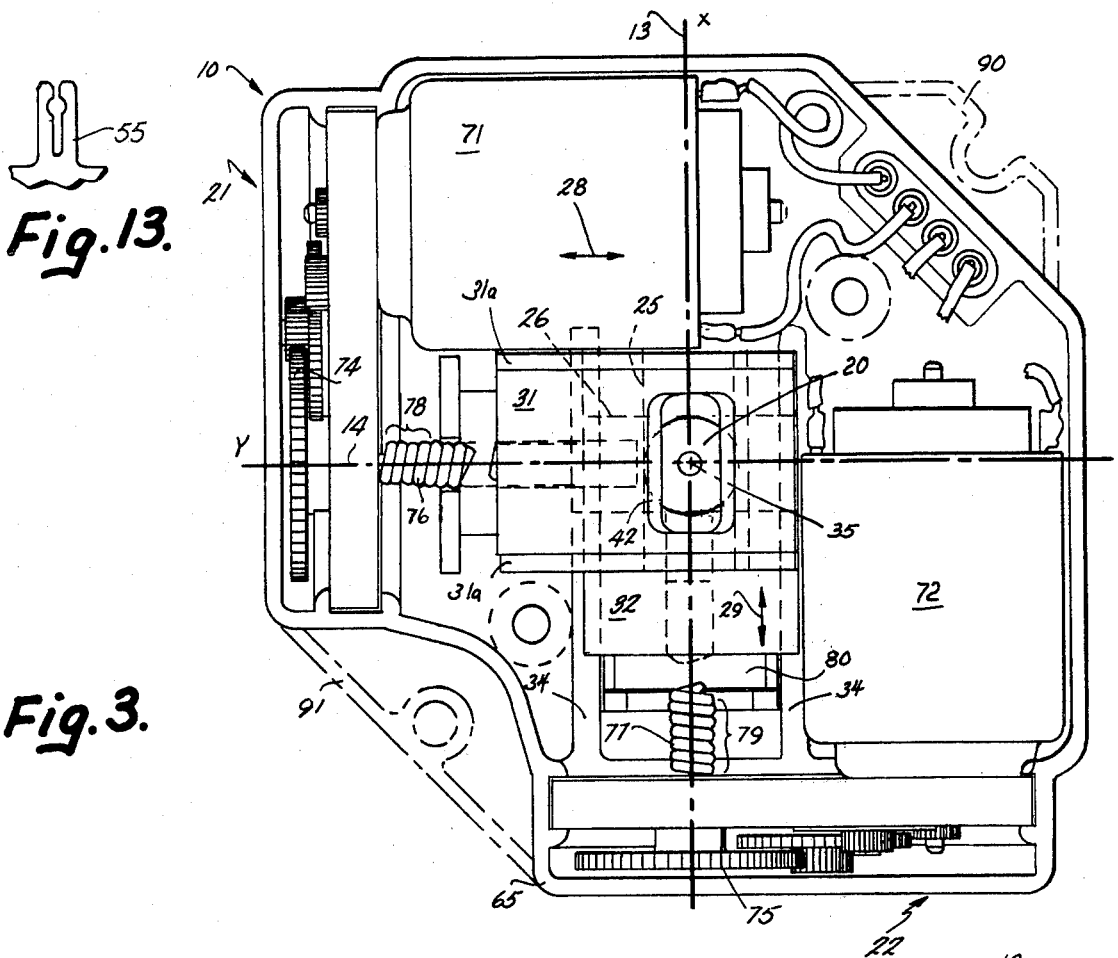
Fig. 13.
Fig. 3.
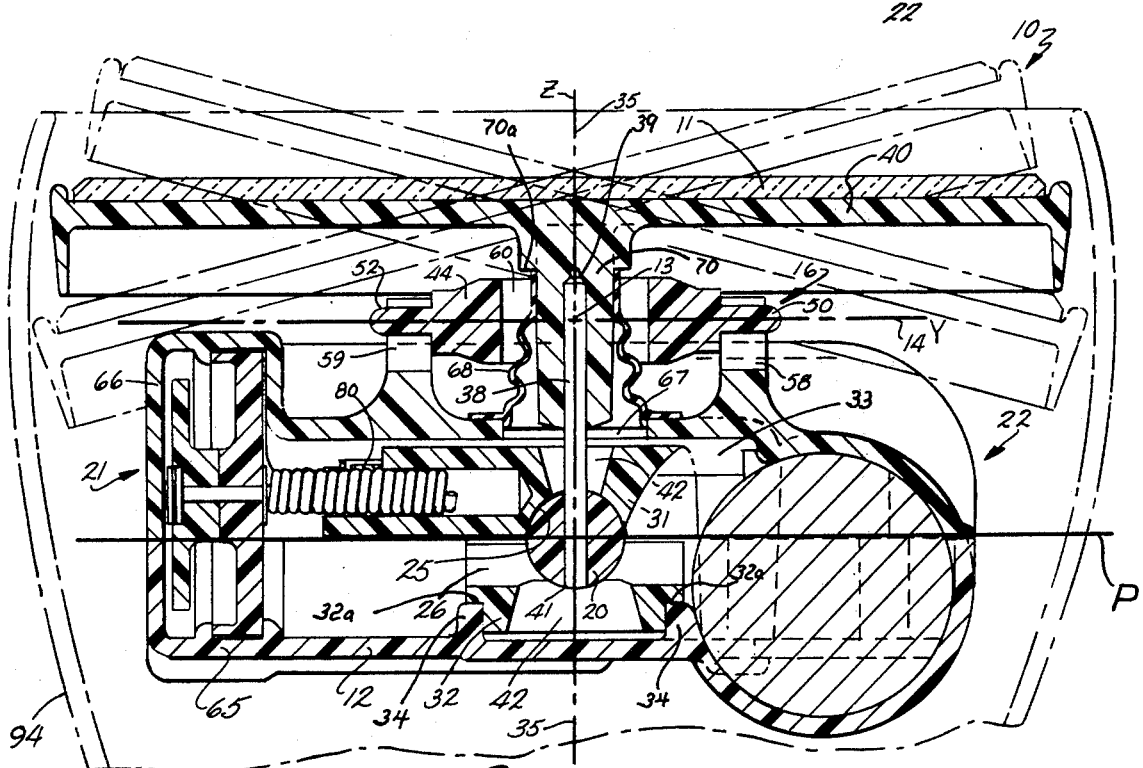
Fig. 2.

ELECTRICALLY OPERATED REMOTE CONTROL REARVIEW MIRROR

BACKGROUND OF THE INVENTION

The invention relates generally to remotely actuated rearview mirrors for motor vehicles, and more particularly, to an electrically actuated outside rearview mirror for motor vehicles which is universally adjustable with separate motions about two oblique, co-planar axes.

Electrically actuated outside rearview mirrors for motor vehicles are known in the prior art. These mirrors are remotely operable from the interior of the vehicle by appropriate actuating switches or the like. In many cases, these mechanisms only provide for the pivotal movement of the mirror or mirrors about the vertical axis. Such electrically actuated rearview mirrors adjustable about a vertical axis are frequently found on trucks, buses, tractor trailers and the like.

Electrically actuated outside rearview mirrors and similarly related devices which are adapted to be pivoted about a pair of non-colinear or orthogonal axes, such as a horizontal and vertical axis, are of coursee more complex and costly. This added cost and complexity is a factor that has led to the popularity of mechanical cable actuated remote control rearview mirrors in the automotive field. The electrical actuation of outside rearview mirrors is more difficult because of the requirement of pivoting the mirrors about mutually orthogonal axes. This dictates the use of two separate electrical drive mechanisms which are operable independently of each other. Even though relatively small electrical motors are available, there are obvious difficulties in packaging the motor and associated drive train within the mirror housing in a manner that withstands extreme temperatures, vibration, shock loading, moisture, salt and other road chemicals. Road vibration is a particularly acute problem with several prior art designs since these designs allow the mirror to flutter at certain vibration frequencies encountered during normal road travel, thus blurring the mirror image and substantially reducing the effectiveness of the mirror. Moreover, these prior art designs do not provide for accuracy of operation in that the operating clearances apparently required by the design of their drive means and the mode of coupling the same with the mirror are such that the mirror is subject to uncontrolled multi-directional pivotal movements or "drift", as opposed to accurately controlled single-directional pivotal movement, when either of its drive means is independently operated, as for instance when an operator desired to achieve only vertical or horizontal adjusting movements of the mirror.

A further problem associated with many prior art electrically actuated rearview mirrors is a lack of adjustability in the event of a power failure. Power failures are not uncommon in these mirrors because of the aforementioned design problems, as well as other problems associated with these mirrors and their power supplies. This lack of adjustability can cause a dangerous set of circumstances wherein the mirror has little or no utility to the operator because of its lack of adjustability to accommodate operators with varying heights and seating positions.

SUMMARY OF THE INVENTION

In accordance with the present invention, there is provided an improved rearview mirror construction permitting the mirror to be accurately adjusted independently about mutually orthogonal axes and be essentially free of road vibration induced flutter. The present invention additionally results in the provision of a relatively simple fabricated and assembled mirror construction featuring the utilization of an improved arrangement for simply and effectively sealing off and preventing the introduction of moisture or other corrosive materials inwardly of the protective housing for the mirror drive means through a housing aperture receiving a drive connection between the drive means and the mirror.

According to the present invention, an improved, electrically actuated rearview mirror is provided of the type which is universally adjustable about mutually orthogonal X and Y axes. The rearview mirror comprises a support housing and a mirror pivotally mounted on the housing about at least mutually orthogonal X and Y axes. A sphere is mounted on the back of the mirror and X and Y drive means are provided for pivoting the mirror about the X and Y axes, when electrical power is applied to the drive means. The X and Y drive means include first and second cylindrical or angular surfaces, respectively. The cylindrical or angular surfaces slidably engage and encompass the sphere. The first and second surfaces extend in mutually orthogonal directions and are reciprocally mounted in the housing to effectively pivot the mirror about the X and Y axes when one or both of the first and second surfaces are reciprocated in the housing. By driving the pivotal mirror with a sphere encompassed by the first and second cylindrical surfaces, the mirror can be accurately adjusted and securely retained at predetermined angular orientations to effectively eliminate the vibration induced flutter problem heretofore encountered with electrically actuated rearview mirrors.

According to more narrow aspects of the invention, each of the X and Y drive means is provided with a worm gear drive in the form of an output shaft having a helical track, a slide containing a cylindrical or angular surface and a follower disposed on the slide. The follower is normally spring biased into engagement with the helical track. The follower slidably engages the helical track, and during the normal operation of the mirror, rotation of the output shaft reciprocates the slide upon which the follower is mounted for actuating the mirror about one of the X or Y axes. However, in the case of a power failure, or in the case where the mirror reaches one of its adjustment stops, the spring biased follower is free to jump between adjacent grooves on the helical track when the operator manually adjusts the mirror in the case of a power failure or when power is applied after the mirror has reached an adjustment stop. Thus, in the case of a power failure the mirror may be manually adjusted to various positions by applying pressure to the mirror and effecting a ratchet-like movement of the mirror until the desired angular orientation is achieved. Furthermore, this feature provides a clutch-like mechanism that eliminates the possibility of damage to the drive means in the case where the operator attempts to actuate the mirror after the mirror has already reached an adjustment stop.

Furthermore, according to more narrow aspects of the invention, the mirror is connected to the support housing by a universal joint having a circular aperture extending therethrough. The sphere is reciprocally mounted on a wobble stick or control rod extending from the back of the mirror along a Z axis that is mutually orthogonal to the X and Y axes. The housing fully encases the X and Y drive means and the sphere. The wobble stick extends through an aperture in the housing and a flexible boot surrounds the aperture in the housing through which the wobble stick extends. The flexible boot extends through the center of the universal joint and is sealed to the back of the mirror to effectively insulate the X and Y drive means, the wobble stick and the sphere from the environment. This eliminates many of the problems heretofore encountered with the maintenance of the drive means due to salt, moisture, grit and other environmental debris.

BRIEF DESCRIPTION OF THE DRAWINGS

FIG. 1 is a plan view, in section, of the rearview mirror of the present invention.

FIG. 2 is a side elevational view, in section, of the rearview mirror of the present invention.

FIG. 3 is a rear elevational view, with respect to the vehicle it is to be mounted on, of the housing of the rearview mirror of the present invention, with the rear cover plate removed.

FIG. 4 is an elevational view of a slider incorporated in the rearview mirror of the present invention.

FIG. 5 is a sectional view of the slider illustrated in FIG. 4, taken along line V—V in FIG. 4.

FIG. 6 is an end side view of the slider illustrated in FIG. 4.

FIG. 7 is an elevational view of a universal joint cross used in the rearview mirror of the present invention.

FIG. 8 is a sectional view of the cross illustrated in FIG. 7 taken along line VIII—VIII in FIG. 7.

FIG. 9 is an elevational view of a follower used in the rearview mirror of the present invention.

FIG. 10 is a view of the follower of FIG. 9 taken along line X—X of FIG. 9.

FIG. 11 is a partial sectional view to an enlarged scale of the follower of FIG. 10 taken along line XI—XI in FIG. 10.

FIG. 12 is a partial sectional view to an enlarged scale of the follower of FIG. 10 taken along XII—XII of FIG. 10.

FIG. 13 is a detailed view of a bifurcated bearing post employed in the rearview mirror of the present invention.

FIG. 14 is an end view partially in section of a slide with a follower mounted thereon.

DESCRIPTION OF THE PREFERRED EMBODIMENTS

Referring now to FIGS. 1, 2 and 3, an electrically actuated rearview mirror assembly is illustrated at 10. The assembly comprises a mirror 11, a mirror support in the form of a housing 12, and means for pivotally mounting the mirror 11 on the support 12 about mutually orthogonal X and Y axes 13 and 14, respectively. Preferably, the means for pivotally mounting the mirror 11 comprises a universal joint 16 of the general type disclosed in commonly assigned U.S. Pat. No. 4,286,841. However, it should be understood that any conventional mounting arrangement providing at least two independent rotational degrees of freedom may be adapted for use with the present invention. For example a ball and socket which normally provides three rotational degrees of freedom would provide the requisite amount of rotational freedom. The assembly 10 further includes an actuator member, preferably in the form of a sphere 20 mounted on the back of the mirror 11; and remotely actuated drive means including X or first and Y or second drive means 21 and 22, respectively, which are mounted on support 12 and operably engaged with sphere 20 for the purpose of effecting accurately controlled pivotal movements of mirror 11 about axes 13 and 14 in the manner to be described.

The X and Y drive means 21 and 22 include first and second concave cylindrical surfaces 25 and 26, respectively, which are disposed to extend in mutually orthogonal directions, as illustrated in FIG. 3 and are arranged in engagement with opposite portions or sides of the surface of sphere 20, as illustrated in FIGS. 1 and 2. Preferably, surfaces 25 and 26 have radii of curvature essentially corresponding to the radius of curvature of sphere 20 and extend through an arc $\alpha$, shown in FIG. 5, which approaches 180 degrees. However, the first and second surfaces 25 and 26 may have any concave shape that at least partially encompasses the sphere 20. For example, the surfaces 25 and 26 may be V-shaped in cross section or together may present a hexagonal shape. A concave angular shape may be preferred to facilitate manufacturing. However, in the present embodiment a cylindrical shape is preferred since it provides line rather than point contact with the sphere 20. The first and second cylindrical surfaces 25 and 26 are mounted for reciprocating movement within the support 12 and cooperate to constrain sphere 20 for movements in mutually orthogonal directions within a plane designated as "P" in FIGS. 1 and 2. With particular reference now to FIG. 3, it will be understood that when the first cylindrical surface 25 is displaced in the direction of the arrows 28 and surface 26 is maintained stationary, the sphere is forced by surface 25 to move in a direction aligned with arrows 28, while undergoing relative sliding movement axially along surface 26, to effect pivotal movement of mirror 11 solely about the X axis 13. Likewise, when the second cylindrical surface 26 is displaced in the direction of the arrows 29, and surface 25 is maintained stationary, sphere 20 is forced by surface 26 to move in a direction aligned with arrows 29, while undergoing relative sliding movement axially along surface 25 to effect pivotal movement of mirror 11 solely about the Y axis 14. If X and Y drive means 21 and 22 are simultaneously operated, surfaces 25 and 26 will be displaced at the same time and sphere 20 will experience driven displacements by and undergo sliding movements relative to both of such surfaces. Thus, surfaces 25 and 26 cooperate, when displaced in the manner described above, to provide for accurately controlled single-directional or multi-directional pivotal movements of mirror 11, as desired, and further by encapsulating sphere 20 in a closely confined manner serve to hold the mirror 11 firmly at predetermined angular orientations in a manner that substantially eliminates mirror flutter induced by road vibration.

The first and second cylindrical surfaces 25 and 26 are preferably defined by first and second slide members or slides 31 and 32, respectively, which are of identical constructions with a representative slide 31 being shown in detail in FIGS. 4, 5 and 6. The slide members are shown in FIGS. 1 and 2 as being supported for reciprocating movements in mutually orthogonal directions by pairs of parallel guide rails 33 and 34, which are fixed to support 12 and slidably engage within pairs of parallel guide recesses 31a and 32a arranged to extend lengthwise of slide members 31 and 32, respectively. Preferably, the sphere 20 and the first and second slides 31 and 32 are formed from a lubricious plastic to reduce frictional losses in the drive means. It would also be preferable to provide suitable spring means operable to continuously bias surfaces 25 and 26 into compressive engagement with sphere 20 and slide members 31 and 32 into engagement with sphere 20 and slide members 31 and 32 into engagement with guide rails 33 and 34 in order to prevent the occurrence of any lost motion in the drive means, as might otherwise result from required manufacturing tolerances of these elements or temperature induced expansions/contractions of the overall mirror assembly. This spring means would preferably be provided by forming slide members 31 and 32 of a plastic material capable of undergoing a required degree of resilient deformation and sizing the slide elements such that they become slightly bowed or deformed as a result of being installed in engagement with sphere 20 and their associated guide rails. Alternatively, guide rails 33 and 34 could be formed of a resiliently deformable material or separate spring elements could be employed to provide a desired degree of bias.

The electrically actuated rearview mirror assembly 10 further includes a Z axis 35 extending in a direction mutually orthogonal to the X and Y axes 13 and 14, respectively. The sphere 20 preferably is slidably mounted on the back of mirror 11 for reciprocal movement along the Z axis 35. Means for slidably mounting the sphere 20 on the back of the mirror 11 is provided comprising a wobble stick or control rod 38 extending rearwardly from the mirror 11 along the Z axis 35. In this case the wobble stick 38 is rigidly secured to the mirror 11 by pressing the wobble stick 38 into a cylindrical aperture 39 provided in a backing plate 40 of mirror 11, and the sphere 20 is provided with a centrally located cylindrical aperture 41 for slidably receiving the wobble stick 38. However, it should be understood that in the alternative the sphere 20 may be fixed on the wobble stick 38, or integrally formed therewith, and the wobble stick 38 may be slidably received in the aperture 39 provided on the back of the mirror. The slides 31 and 32 include apertures 42 through which the wobble stick freely extends. The sphere 20 must be displaceable relative to the back of mirror 11 along the Z axis 35, since the mirror 11 is displaced with pivotal movements and the sphere 20 is displaced linearly.

Preferably, the means for pivotally mounting the mirror 11 about the X and Y axes 13 and 14 comprises a universal joint, generally indicated by the numeral 16. The universal joint comprises a cross 44, separately illustrated in further detail in FIGS. 7 and 8. The cross 44 is provided with arms 45 through 48, including bearing shafts 49 through 52 disposed on the ends thereof. The bearing shafts 49 and 51 are disposed on the X axis 13 and are preferably snap-locked in place in bifurcated bearing posts 55 and 56, disposed on the backing plate 40 of the mirror 11. As best illustrated in FIG. 2, the bearing shafts 50 and 52 extend along the Y axis 14 and are preferably snap-locked in place in bifurcated bearing posts 58 and 59 disposed on the support 12. FIG. 13 presents a detailed view of a representative bifurcated bearing post 55. In this manner, the mirror 11 is easily mounted to the housing 12 by snapping the shafts 49 through 52 of the cross 44 into the bifurcated posts 55 through 59 of the mirror backing plate 20 and the housing 12.

The universal joint cross 44 further includes a central aperture 60 through which the wobble stick 38 extends. This feature facilitates a superior arrangement for sealing the wobble stick 38, the sphere 20 and the X and Y drive means 21 and 22 from environmental debris. More specifically, the support 12 comprises first and second housing halves 65 and 66 which fully encapsulate the X and Y drive means 21 and 22 and the sphere 20 with the exception of an aperture 67 disposed in the second housing half 66. The wobble stick 38 extends through the aperture 67. A flexible boot 68 encompasses the wobble stick 38 and has a first end positionally located by a cylindrical boss 70 and an annular clamping surface 70a forming a part of mirror backing plate 40, and a second end positionally located by aperture 67 and the outer surface of housing half 66. Preferably, boot 68 is formed of a resiliently deformable material and when installed is maintained in an axially compressed condition sufficient to bias its ends into fluid sealing engagement with clamping surface 70a and housing half 66. This arrangement thus effectively seals the wobble stick 38, the sphere 20, and the X and Y drive means 21 and 22 from the environment. The only flexible or pliable portion of the sealed structure is the relatively small boot 68 which is placed at a central location in the center of the assembly protected by the cross 44, making rupture of the boot improbable.

With particular reference now to FIG. 3, the X and Y drive means 21 and 22 are illustrated in further detail. The X and Y drive means 21 and 22 comprise reversible drive motors 71 and 72, respectively, that are connected to a suitable power supply and suitable control circuitry not illustrated herein. Furthermore, the motors 71 and 72 are provided with non-reversible gear reduction transmissions 74 and 75, respectively, interconnecting the drive motors 71 and 72 with output shafts 76 and 77, respectively. The output shafts 76 and 77 are each at least partially covered or encompassed by helical tracks, or worm gears, 78 and 79, respectively, such as may be defined by closely wound helical springs. The first and second slides 31 and 32 are provided with first and second clutch mechanisms including followers 80. The followers 80 slidably engage the helical tracks 78 and 79 so that the first and second slides 31 and 32 reciprocate lengthwise of guide rails 33 and 34 when the output shafts 76 and 77 rotate. Rotation of the drive motor 71 or 72, respectively, will cause movement of one of the slides 31 or 32 in a direction dependent on the direction of rotation of the respective drive motor. Preferably the followers 80 are spring biased into engagement with the helical tracks 78 and 79. Spring biasing of the followers 80 into engagement with the helical tracks 78 and 79 allows the tracking force created by engagement of the followers and the tracks to be overcome by an operator manually exerting a turning force on the mirror 11 so that in the heretofore potentially dangerous situation where a power loss occurs, the operator can manually adjust the mirror in a ratchet-like fashion by physically rotating the mirror with a force sufficient to overcome the tracking force created by the spring biased followers 80. When the operator applies a manual adjustment force, the mirror will move in the intended direction upon the application of sufficient force in a step-like, ratchet-like manner that is created by the spring biased followers jumping to adjacent grooves on the helical tracks 78 and 79. Furthermore, this feature prevents damage or overstressing of the drive train components of the X and Y drive means when an adjustment stop of the mirror 11 is met. In this case, when the operator does not realize that the mirror has reached an adjustment stop and further power is applied to one or both of the X and Y drive means, rather than binding the drive motors to a stop, the drive motors and transmission are permitted to continue to rotate while the spring biased followers 80 jump to adjacent grooves on the helical tracks 78 and 79. This action results in a clicking noise that is appreciated by the operator as an indication that he has reached a limit stop.

With further reference now to FIGS. 4 through 6 which illustrate the slides of the X and Y drive means and FIGS. 9 through 12 which illustrate details of the spring biased followers. Each follower comprises a spring clip in the form of a leaf spring 81 having at least one projection 82 mounted thereon. The projections 82 engage the grooves defined by tracks 78 and 79 on the output shafts of the X and Y drive means. Each leaf spring 81 is provided with resilient arcuate arms 84 disposed on opposite ends thereof for engaging surfaces 85 disposed on the slides. After the free ends of helical tracks 78 and 79 are inserted within cylindrical apertures or bearing openings 86 formed in slides 31 and 32, the leaf springs 81 are snap-locked over the gripping surfaces 85 with the projections 82 extending into apertures 86 for engagement with the helical tracks. Apertures 86 are aligned with the direction of reciprocating movement of their associated slides and preferably sized to both rotatably and slidably receive helical tracks 78 and 79. FIG. 14 illustrates a follower 80 installed on a slider 31. It will be noted that the follower 80 is provided with a bead 87 for stiffening the follower in the area of projections 82. This prevents fatigue stress failure of the follower in the area of the projections 82. The generally cylindrical gripping surface 85 is relieved at 88 to allow the resilient arms 84 to flex when the projections 82 jump between adjacent grooves on one of the helical tracks.

With particular reference now to FIGS. 2 and 3, it is illustrated that the housing 12 is provided with mounting flanges illustrated in phantom at 90 and 91. The mounting flanges 90 and 91 are carried by the second housing half 66 and cooperate with mounting bosses (not illustrated herein) disposed within a mirror shell, illustrated in phantom at 94 in FIG. 2. Screws, bolts, or other suitable fasteners are used to mount the housing 12 within the mirror shell 94. Thereafter, the mirror 11 may be snap-locked in place for pivotal movement about the X and Y axes as illustrated in phantom in FIG. 2.

While the present invention is particularly intended for use with an electrically operated motor assembly, it will be understood that the X and Y drives may be otherwise powered, if desired.

The above description should be considered as exemplary and that of the preferred embodiment only. The true spirit and scope of the present invention should be determined by reference to the appended claims. It is desired to include within the appended claims all modifications of the invention that come within the proper scope of the invention.

The embodiments of the invention in which an exclusive property or privilege is claimed are defined as follows:

1. An electrically actuated rearview mirror comprising:
    an X axis;
    a Y axis;
    a Z axis, said X axis, said Y axis and said Z axis being mutually orthogonal;
    a mirror;
    a support for said mirror;
    means for mounting said mirror on said support for pivotal movement about at least said X and Y axes;
    a sphere;
    means for mounting said sphere on the back of said mirror for conjunctive pivotal movement with said mirror about said X and Y axes and reciprocal movement about said Z axis;
    an X drive means for pivoting said mirror about said X axis when electrical power is applied to said X drive means, said X drive means including a first surface encompassing at least a portion of one-half of said sphere, said first surface slidably engaging said sphere;
    a Y drive means for pivoting said mirror about said Y axis when electrical power is applied to said Y drive means, said Y drive means including a second surface encompassing at least a portion of the opposing half of said sphere, said second surface slidably engaging said sphere, said first and second surfaces extending in mutually orthogonal directions; and
    said X and Y drive means including means for displacing said first and second surfaces in mutually orthogonal directions, said first and second surfaces being displaced in directions which are orthogonal to the directions in which said first and second surfaces extend, respectively, said first and second surfaces being displaceable when power is applied to said X and Y drive means, respectively, to effect displacements of said sphere and imparting pivotal movements to said mirror.

2. The electrically actuated rearview mirror of claim 1 wherein said first and second surfaces are cylindrical in shape and each of said cylindrical surfaces extends along an arc of approximately 180° about said sphere.

3. The electrically actuated rearview mirror of claim 1 wherein said first and second surfaces encompass opposing sides of said sphere and said rearview mirror further includes means for compressing said sphere between said first and second surfaces.

4. The electrically actuated rearview mirror of claim 2 wherein said sphere and said first and second cylindrical surfaces are formed from a lubricious plastic.

5. The electrically actuated rearview mirror of claim 4 wherein said means for mounting said sphere comprises a wobble stick extending from the back of said mirror, said sphere being slidably received by said wobble stick.

6. The electrically actuated rearview mirror of claim 5 wherein said means for mounting said sphere comprises a wobble stick slidably received on the back of said mirror, said sphere being mounted on said wobble stick.

7. The electrically actuated rearview mirror of claim 5 wherein said means for mounting said mirror comprises a universal joint.

8. The electrically actuated rearview mirror of claim 7 wherein said universal joint includes a cross comprised of four arms and bearing means disposed on each of said arms.

9. The electrically actuated rearview mirror of claim 8 wherein said cross includes a central aperture through which said wobble stick extends.

10. The electrically actuated rearview mirror of claim 9 wherein said support comprises a housing for encapsulating said sphere and said X and Y drive means, said wobble stick extending through an aperture in said housing.

11. The electrically actuated rearview mirror of claim 10 further including a flexible boot encompassing said wobble stick and extending through said central aperture in said cross, said boot being seated around said aperture in said housing and sealed to the back of said mirror to isolate said wobble stick, said sphere and said X and Y drive means from the surrounding environment.

12. The electrically actuated rearview mirror of claim 1 wherein each of said X and Y drive means includes an output shaft, a helical track encompassing a portion of said output shaft, a follower and a slide.

13. The electrically actuated rearview mirror of claim 12 wherein said slide associated with said X drive means includes said first surface and said slide associated with said Y drive means includes said second surface, each of said slides being slidably mounted in mutually orthogonal tracks disposed on said support.

14. The electrically actuated rearview mirror of claim 13 wherein said follower is disposed on said slide, and slidably engages said helical track whereby rotation of said output shaft displaces said slide.

15. The electrically actuated rearview mirror of claim 14 wherein said follower is spring biased into engagement with said helical track, said follower being provided with a predetermined biasing force sufficiently strong to prevent slippage of said mirror during normal operating conditions, but weak enough to be overcome by said drive means when said slide reaches a stop and by application of manual force when an operator manually positions said mirror.

16. The electrically actuated rearview mirror of claim 15 wherein said follower comprises a leaf spring mounted on said slide and at least one projection disposed on said leaf spring for slidably engaging said helical track.

17. The electrically actuated rearview mirror of claim 16 wherein said helical track comprises a close wound coil spring encompassing a portion of said output shaft.

18. A remotely actuated rearview mirror comprising in combination:
a mirror;
a support;
means for mounting said mirror on said support for multi-directional pivotal movements relative thereto;
a spherical actuating member;
means for mounting said actuating member on a back of said mirror for conjunctive pivotal movements therewith and for independent reciprocating movements relative thereto in a direction essentially normal to said back of said mirror;
remotely actuated drive means carried by said support and including first and second means disposed in engagement with said actuating member and cooperating to constrain said actuating member for movements in independent directions within a plane to impart said multi-directional pivotal movements to said mirror and said reciprocating movements of said actuating member as an incident thereto; and
said remotely actuated drive means including first and second slide members, first and second means for mounting said first and second slide members on said support for reciprocating movements in said independent directions, and first and second means for imparting reciprocating movements to said first and second slide members, said first and second slide members defining first and second concave shaped surfaces extending transversely of the direction of the reciprocating movements of said first and second slide members, and said first and second surfaces being disposed in sliding surface-to-surface engagement with oppositely disposed portions of said spherical actuating member.

19. The remotely actuated rearview mirror of claim 18, wherein said first and second concave surfaces comprise first and second cylindrically shaped surfaces and at least one of said first and second slide members and said first and second means for mounting said first and second slide members is resiliently deformable and operable to the bias of said first and second cylindrically shaped surfaces into engagement with said spherical actuating member.

20. The remotely actuated rearview mirror of claim 19, wherein said first and second slide members are formed with first and second bearing openings aligned with the direction of reciprocating movement thereof; and said first and second means for imparting reciprocating movements to said first and second slide members includes first and second worm gear means each having first and second ends, said first ends of said first and second worm gear means being slidably and rotatably received within said first and second bearing openings and said second ends of said first and second worm gear means being coupled to first and second means for imparting rotational movements thereto, and first and second clutch mechanisms including first and second spring clips carried by said first and second slide members and normally disposed for driven surface engagement by said first and second worm gears, and said first and second spring clips being deformable for permitting ratchet-like movements thereof relative to said first and second worm gear means.

21. The remotely actuated rearview mirror of claim 18, wherein said support is a housing for enclosing said drive means and said spherical actuator member and is formed with an aperture, said mirror is mounted exteriorly of said housing in essential alignment with said aperture and said means for mounting said actuator member extends through said aperture, said means for mounting said spherical actuator member includes a rod having opposite ends thereof connected to said spherical actuator member and a cylindrical boss projecting from said back of said mirror, at least one of said ends of said rod being slidable axially thereof relative to said spherical actuator member and said cylindrical boss, said cylindrical boss defines an annular clamping surface facing towards said housing; and there is additionally provided in combination a resiliently deformable boot circling said rod and having a first end positionally located by said cylindrical boss and arranged in bearing engagement with said annular clamping surface and a second end positionally located by said aperture and arranged in bearing engagement with said housing, and said annular clamping surface and said housing cooperating to maintain said boot in an axially compressed condition for biasing said first and second ends of said boot into fluid sealing engagement with said mirror and said housing.

22. A servomechanism for moving a device to different angular orientations comprising:
an X axis;
a Y axis;
a Z axis, said X axis, said Y axis, and said Z axis being mutually orthogonal;
a device;
a support for said device;
means for mounting said device on said support, said means for mounting providing at the least for pivotal movement of said device with respect to said support about said X and Y axes;
a sphere;
means for mounting said sphere on the back of said device for conjunctive pivotal movement with said device about said X and Y axes and reciprocal movement about said Z axis;
an X drive means for pivoting said device about said X axis when power is applied to said X drive means, said X drive means including a first concave surface encompassing and slidably engaging a portion of one-half of said sphere; and
a Y drive means for pivoting said device about said Y axis when power is applied to said Y drive means, said Y drive means including a second concave surface encompassing and slidably engaging a portion of one-half of said sphere, said first and second surfaces extending in mutually orthogonal directions; and
said X and Y drive means including means for displacing said first and second surfaces in mutually orthogonal directions, said first and second surfaces being displaced in directions which are orthogonal to the directions in which said first and second surfaces extend, respectively, said first and second surfaces being displaceable when power is applied to said X and Y drive means, respectively, to effect displacements of said sphere and imparting pivotal movements to said device.

23. The servomechanism of claim 22 wherein said first and second surfaces are cylindrical in shape and each of said cylindrical surfaces extends in an arc of approximately 180° about said sphere.

24. The servomechanism of claim 22 wherein said first and second surfaces encompass opposing sides of said sphere and said servomechanism further includes means for compressing said sphere between said first and second surfaces.

25. The servomechanism of claim 23 wherein said sphere and said first and second cylindrical surfaces are formed from a lubricious plastic.

26. The servomechanism of claim 25 wherein said means for mounting said sphere comprises a wobble stick extending from the back of said device, said sphere being slidably received by said wobble stick.

27. The servomechanism of claim 25 wherein said means for mounting said sphere comprises a wobble stick slidably received on the back of said device said sphere being mounted on said wobble stick.

28. The servomechanism of claim 26 wherein said means for mounting said device comprises a universal joint.

29. The servomechanism of claim 28 wherein said universal joint includes a cross comprised of four arms and bearing means disposed on each of said arms.

30. The servomechanism of claim 29 wherein said cross includes a central aperture through which said wobble stick extends.

31. The servomechanism of claim 30 wherein said support comprises a housing for encapsulating said sphere and said X and Y drive means, said wobble stick extending through an aperture in said housing.

32. The servomechanism of claim 31 further including a flexible boot encompassing said wobble stick and extending through said central aperture in said cross, said boot being seated around said aperture in said housing and sealed to the back of said device to isolate said wobble stick, said sphere and said X and Y drive means from the surrounding environment.

33. The servomechanism of claim 22 wherein each of said X and Y drive means includes an output shaft, a helical track encompassing a portion of said output shaft, a follower and a slide.

34. The servomechanism of claim 33 wherein said slide associated with said X drive means includes said first surface and said slide associated with said Y drive means includes said second surface, each of said slides being slidably mounted in mutually orthogonal tracks disposed on said support.

35. The servomechanism of claim 34 wherein said follower is disposed on said slide, and slidably engages said helical track whereby rotation of said output shaft displaces said slide.

36. The servomechanism of claim 35 wherein said follower is spring biased into engagement with said helical track, said follower being provided with a predetermined biasing force sufficiently strong to prevent slippage of said device during normal operating conditions, but weak enough to be overcome by said drive means when said slide reaches a stop and by application of manual force an operator manually positions said device.

37. The servomechanism of claim 36 wherein said follower comprises a leaf spring mounted on said slide and at least one projection disposed on said leaf spring for slidably engaging said helical track.

38. The servomechanism of claim 37 wherein said helical track comprises a close wound coil spring encompassing a portion of said output shaft.

* * * * *